(12) United States Patent (10) Patent No.: US 11,539,690 B2
Nakagawa et al. (45) Date of Patent: Dec. 27, 2022

(54) AUTHENTICATION SYSTEM, AUTHENTICATION METHOD, AND APPLICATION PROVIDING METHOD

(71) Applicant: Capy Japan Inc., Tokyo (JP)

(72) Inventors: Kazuhiro Nakagawa, Tokyo (JP); Takanobu Watanabe, Tokyo (JP); Mitsuo Okada, Tokyo (JP)

(73) Assignee: Capy Japan Inc., Tokyo (JP)

( * ) Notice: Subject to any disclaimer, the term of this patent is extended or adjusted under 35 U.S.C. 154(b) by 172 days.

(21) Appl. No.: 17/121,664

(22) Filed: Dec. 14, 2020

(65) Prior Publication Data

US 2021/0234857 A1 Jul. 29, 2021

Related U.S. Application Data

(63) Continuation of application No. PCT/JP2018/022972, filed on Jun. 15, 2018.

(51) Int. Cl.
*H04L 9/40* (2022.01)
*G06F 21/62* (2013.01)
*H04L 9/32* (2006.01)

(52) U.S. Cl.
CPC ........ *H04L 63/0853* (2013.01); *G06F 21/629* (2013.01); *H04L 9/3234* (2013.01); *H04L 9/3236* (2013.01)

(58) Field of Classification Search
CPC . H04L 63/0853; H04L 63/083; H04L 9/3234; H04L 9/3236; H04L 9/3247; G06F 21/629; G06F 21/44; G06F 21/34
See application file for complete search history.

(56) References Cited

U.S. PATENT DOCUMENTS

2015/0106908 A1* 4/2015 Carpenter ........... G06F 21/6218
726/5
2019/0124081 A1* 4/2019 Nowak ............... H04L 63/0892

FOREIGN PATENT DOCUMENTS

JP 2005258687 9/2005
JP 2008152612 7/2008
(Continued)

OTHER PUBLICATIONS

"International Search Report (Form PCT/ISA/210) of PCT/JP2018/022972," dated Aug. 28, 2018, with English translation thereof, pp. 1-3.
(Continued)

*Primary Examiner* — Nelson S. Giddins
(74) *Attorney, Agent, or Firm* — JCIPRNET

(57) ABSTRACT

An application server of an authentication system includes a requesting part that makes a request for possession authentication which is authentication using an authenticator, when the requesting part receives a request for authentication of a user from a terminal, a verifying part that receives an authentication result of the possession authentication and information for verification from the authentication server, and verifies the validity of the authentication server on the basis of the received information for verification, and a providing part that provides a function related to the application to the terminal if the verifying part verifies that the authentication server is valid. The authentication server of the authentication system includes a possession authentication part and a result transmission part that transmits the authentication result of the possession authentication and the information for verification to the application server.

11 Claims, 8 Drawing Sheets

(56) References Cited

FOREIGN PATENT DOCUMENTS

| | | |
|---|---|---|
| JP | 2010015263 | 1/2010 |
| JP | 2011129040 | 6/2011 |

OTHER PUBLICATIONS

"Written Opinion of the International Searching Authority (Form PCT/ISA/237) of PCT/JP2018/022972," dated Aug. 28, 2018, with English translation thereof, pp. 1-13.

* cited by examiner

AUTHENTICATION SYSTEM, AUTHENTICATION METHOD, AND APPLICATION PROVIDING METHOD

CROSS-REFERENCE TO RELAYED APPLICATIONS

The present application is a continuation application of International Application number PCT/JP2018/022972, filed on Jun. 15, 2018. The contents of this application are incorporated herein by reference in their entirety.

BACKGROUND OF THE DISCLOSURE

The present disclosure relates to an authentication system, an authentication method, and an application providing method. Japanese Unexamined Patent Application Publication No. 2010-015263 discloses a technique of Possession Authentication, which is an authentication method for authenticating a user with an object possessed only by the user, in order to enhance security at the time of authentication.

As the possession authentication, there is a method of performing authentication on the basis of an operation of the user presenting that he/she possesses the authenticator. An authentication procedure for authentication using an authenticator is standardized by, for example, Universal Second Factor (U2F) of Fast IDentity Online (FIDO), but a developer of an application sometimes uses an authentication server for authentications based on said authentication procedure without developing a program corresponding to said authentication procedure, in order to concentrate on development of the application. Until now, communication procedures for possession authentication between an application server providing an application and an authentication server were not defined. Therefore, there is a problem that an application server cannot easily recognize a result of possession authentication.

BRIEF SUMMARY OF THE DISCLOSURE

The present disclosure focuses on these points, and an object of the present disclosure is to enable an application server to easily recognize a result of possession authentication.

An authentication system according to the first aspect of the present disclosure includes an application providing apparatus that provides an application, and an authentication apparatus that performs possession authentication which is authentication using an authenticator possessed by a user using the application, wherein the application providing apparatus includes a requesting part that requests that the possession authentication be performed by the authentication apparatus when the requesting part receives a request for authentication of the user from a terminal used by the user, a verifying part that receives an authentication result of the possession authentication and information for verification used for verifying validity of the authentication apparatus from the authentication apparatus, and verifies the validity of the authentication apparatus on the basis of the received information for verification, and a providing part that provides a function related to the application to the terminal if the verifying part verifies that the authentication apparatus is valid, and the authentication apparatus includes a possession authentication part that performs the possession authentication with the authenticator connected to the terminal when the possession authentication part receives the request for the possession authentication, and a result transmission part that transmits the authentication result of the possession authentication and the information for verification to the application providing apparatus.

An authentication method according to the second aspect of the present disclosure is the authentication method performed by an authentication system that includes an application providing apparatus that provides an application, and an authentication apparatus that performs possession authentication which is authentication using an authenticator possessed by a user using the application, the method including the steps of requesting, by the application providing apparatus, that the authentication apparatus perform the possession authentication using the authenticator when the application providing apparatus receives a request for authentication of the user from a terminal used by the user, performing, by the authentication apparatus, the possession authentication with the authenticator connected to the terminal when the authentication apparatus receives the request for the possession authentication, transmitting, by the authentication apparatus, the authentication result of the possession authentication and information for verification used for verifying validity of the authentication apparatus to the application providing apparatus, receiving the authentication result and the information for verification from the authentication apparatus and verifying validity of the authentication apparatus on the basis of the received information for verification, by the application providing apparatus, and providing, by the application providing apparatus, a function related to the application to the terminal if the verifying part determines that the authentication apparatus is valid.

An application providing method according to the third aspect of the present disclosure includes the steps of requesting authentication apparatus for possession authentication which is authentication using an authenticator possessed by a user, when a receiving part receives a request for authentication of the user from a terminal used by the user, receiving an authentication result of the possession authentication and information for verification used for verifying validity of the authentication apparatus from the authentication apparatus and verifying validity of the authentication apparatus on the basis of the received information for verification, and providing a function related to an application to the terminal if a verifying part determines that the authentication apparatus is valid.

DETAILED DESCRIPTION OF THE DISCLOSURE

Hereinafter, the present disclosure will be described through exemplary embodiments of the present disclosure, but the following exemplary embodiments do not limit the disclosure according to the claims, and not all of the combinations of features described in the exemplary embodiments are necessarily essential to the solution means of the disclosure.

[An Outline of an Authentication System S]

Figure 1:
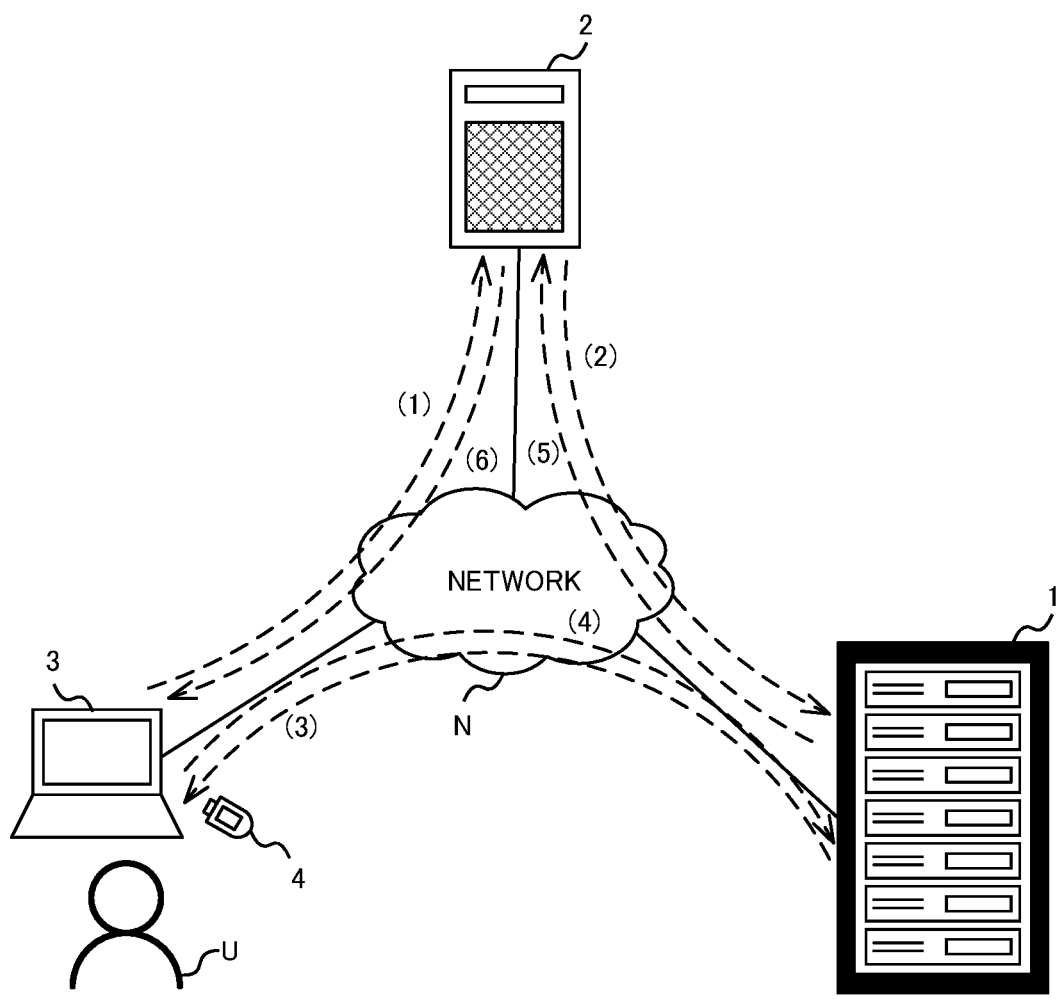
FIG. 1 shows a configuration of an authentication system according to the embodiment.

FIG. 1 shows a configuration of an authentication system S according to the embodiment. The authentication system S is a system that includes an authentication server 1 as an authentication apparatus, an application server 2 as an application providing apparatus, a terminal 3, and an authenticator 4, and performs two-factor authentication.

In the present embodiment, the two-factor authentication is realized by password authentication and possession authentication. The possession authentication is authentication for determining whether or not a user U is an authorized user by determining in the authentication server 1 whether or not the user U possesses the authenticator 4 previously registered in the authentication server 1.

The terminal 3 is, for example, a personal computer used by the user U. The terminal 3 is connected to the authentication server 1 and the application server 2 so as to enable these servers to communicate with each other through a network N such as a LAN, a mobile telephone line network, or Wi-Fi (registered trademark). The authenticator 4, which is used to perform the possession authentication with the authentication server 1, is connected to the terminal 3.

The authentication server 1 is a server that performs the possession authentication using the authenticator 4 possessed by the user U.

The application server 2 is a server that provides an application to the terminal 3. In the embodiment, a plurality of application servers 2 is provided.

Hereinafter, the procedures of processing performed in the authentication system S will be described while referencing (1) to (6). These procedures correspond to (1) to (6) shown in FIG. 1. (1) The application server 2 performs the password authentication upon receiving a request for authentication from the terminal 3. (2) If the password authentication is successful, the application server 2 requests that the authentication server 1 perform the possession authentication of the user of the terminal 3. (3), (4) The authentication server 1 performs the possession authentication with the authenticator 4 through the terminal 3 upon receiving the request for performing the possession authentication of the user of the terminal 3 from the application server 2. (5) The authentication server 1 transmits the authentication result of the possession authentication and information for verification used for verifying validity of the authentication server 1 to the application server 2. (6) The application server 2 provides the user U with a function related to an application if a) the authentication result received from the authentication server 1 indicates that the possession authentication is successful and b) the authentication server 1 is determined to be valid on the basis of the information for verification received from the authentication server 1.

In order to perform the possession authentication when authenticating the user U in the application server 2, an operator of the application server 2 only needs to implement a) a function that performs processing related to the request for performing the possession authentication and b) a function that performs processing related to the verification of the authentication server 1 based on the information for verification. Therefore, the application server 2 can easily recognize the result of the possession authentication in the authentication system S.

[Functional Configurations of the Authentication Server 1 and the Application Server 2]

A functional configuration of the authentication server 1 and a functional configuration of the application server 2 will be described below with reference to FIG. 2.

Figure 2:
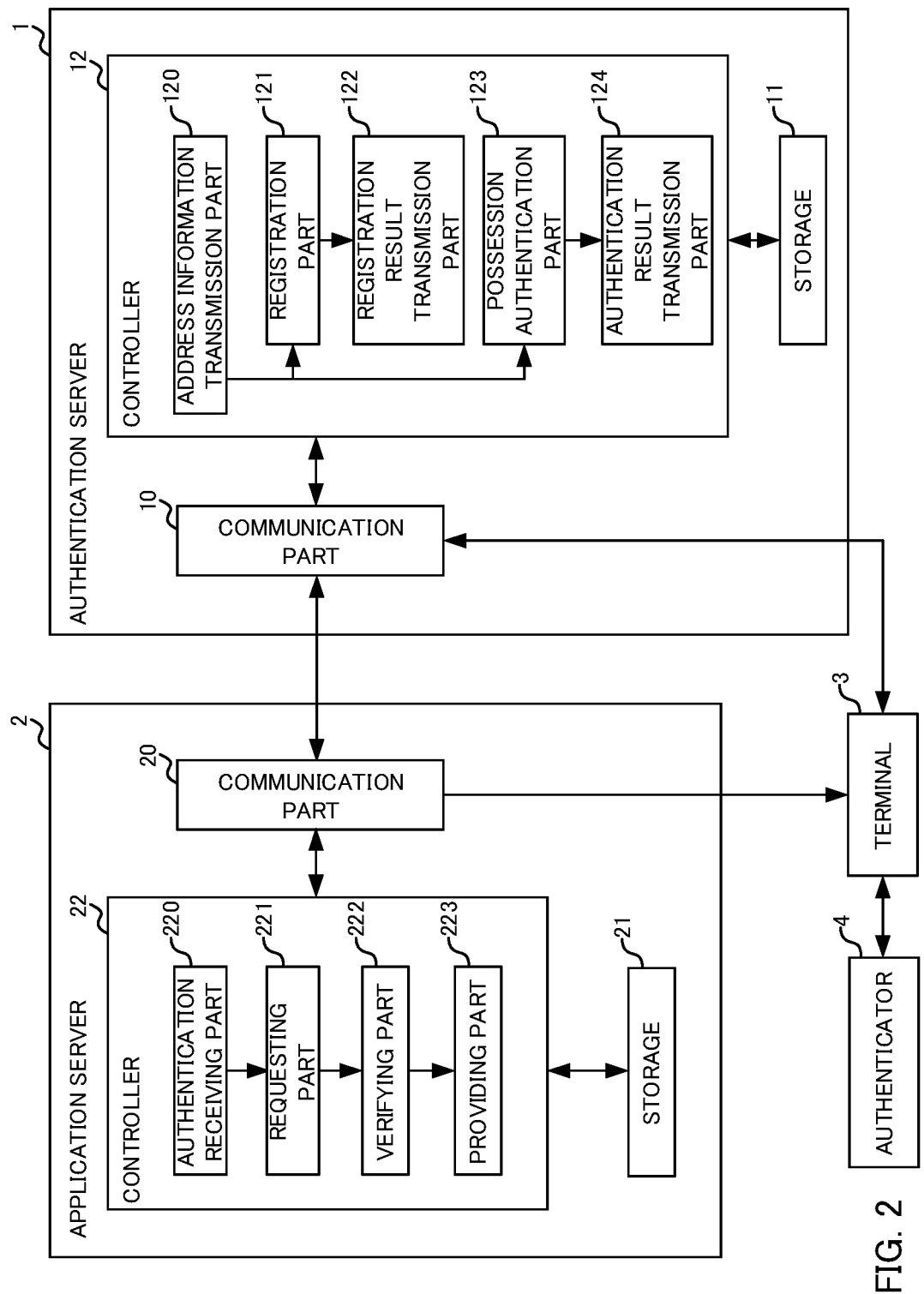
FIG. 2 schematically shows functional configurations of an authentication server and an application server according to the embodiment.

FIG. 2 schematically shows the functional configurations of the authentication server 1 and the application server 2 according to the embodiment. As shown in FIG. 2, the authentication server 1 includes a communication part 10, a storage 11, and a controller 12.

The communication part 10 transmits and receives data to and from the application server 2 and the terminal 3 through the network N.

The storage 11 is a mass storage device such as a Read Only Memory (ROM) for storing a Basic Input Output System (BIOS) of a computer that realizes the authentication server 1, a Random Access Memory (RANI) that serves as a work area of the authentication server 1, a Hard Disk Drive (HDD) and a Solid State Drive (SSD) for storing various types of information including an Operating System (OS) and an application program, and various databases referenced when executing the application program.

The controller 12 is a processor such as a Central Processing Unit (CPU) or a Graphics Processing Unit (GPU) of the authentication server 1, and functions as an address information transmission part 120, a registration part 121, a registration result transmission part 122, a possession authentication part 123, and an authentication result transmission part 124 by executing the program stored in the storage 11.

As shown in FIG. 2, the application server 2 includes a communication part 20, a storage 21, and a controller 22.

The communication part 20 transmits and receives data to and from the authentication server 1 and the terminal 3 through the network N in a similar manner as the communication part 10 of the authentication server 1.

The storage 21 is a mass storage device such as a ROM for storing a BIOS of a computer that realizes the application server 2, a RANI that serves as a work area of the application server 2, an HDD and an SSD for storing various information including an OS and an application program, and various databases referenced when executing the application program. The storage 21 stores a program for authentication for causing the controller 22 to function as an authentication receiving part 220, a requesting part 221, a verifying part 222, and a providing part 223.

The controller 22 is a processor such as a CPU or a GPU of the application server 2, and functions as the authentication receiving part 220, the requesting part 221, the verifying part 222, and the providing part 223 by executing the program stored in the storage 21.

In the embodiment, when the requesting part 221 of the application server 2 receives a request for authentication of a user from the terminal 3 used by the user U, the requesting part 221 determines whether or not information for possession authentication relating to the authenticator 4 possessed by the user U is registered in the authentication server 1. If the requesting part 221 determines that the information for possession authentication is not registered in the authentication server 1, the requesting part 221 requests that the authentication server 1 register the information for possession authentication.

When the registration part 121 of the authentication server 1 receives a request for registering the information for possession authentication, the registration part 121 acquires and registers the information for possession authentication from the terminal 3 to which the authenticator 4 is connected.

If the requesting part 221 determines that the information for possession authentication is registered in the authentication server 1, the requesting part 221 requests that the authentication server 1 perform the possession authentication.

When the possession authentication part 123 of the authentication server 1 receives a request for performing the possession authentication, the possession authentication part 123 performs the possession authentication with the terminal 3 using the authenticator 4.

The authentication result transmission part 124 of the authentication server 1 functions as a result transmission part, and transmits, to the application server 2, a) the authentication result of the possession authentication performed by the possession authentication part 123 and b) the information for verification used for verifying the validity of the authentication server 1.

The verifying part 222 of the application server 2 receives the authentication result of the possession authentication and the information for verification from the authentication server 1, and verifies the validity of the authentication server 1 on the basis of the received information for verification.

If the verifying part 222 verifies that the authentication server 1 is valid, the providing part 223 of the application server 2 provides the function related to the application to the terminal 3.

[A Sequence for Registering Information about the Authenticator 4]

Figure 3:
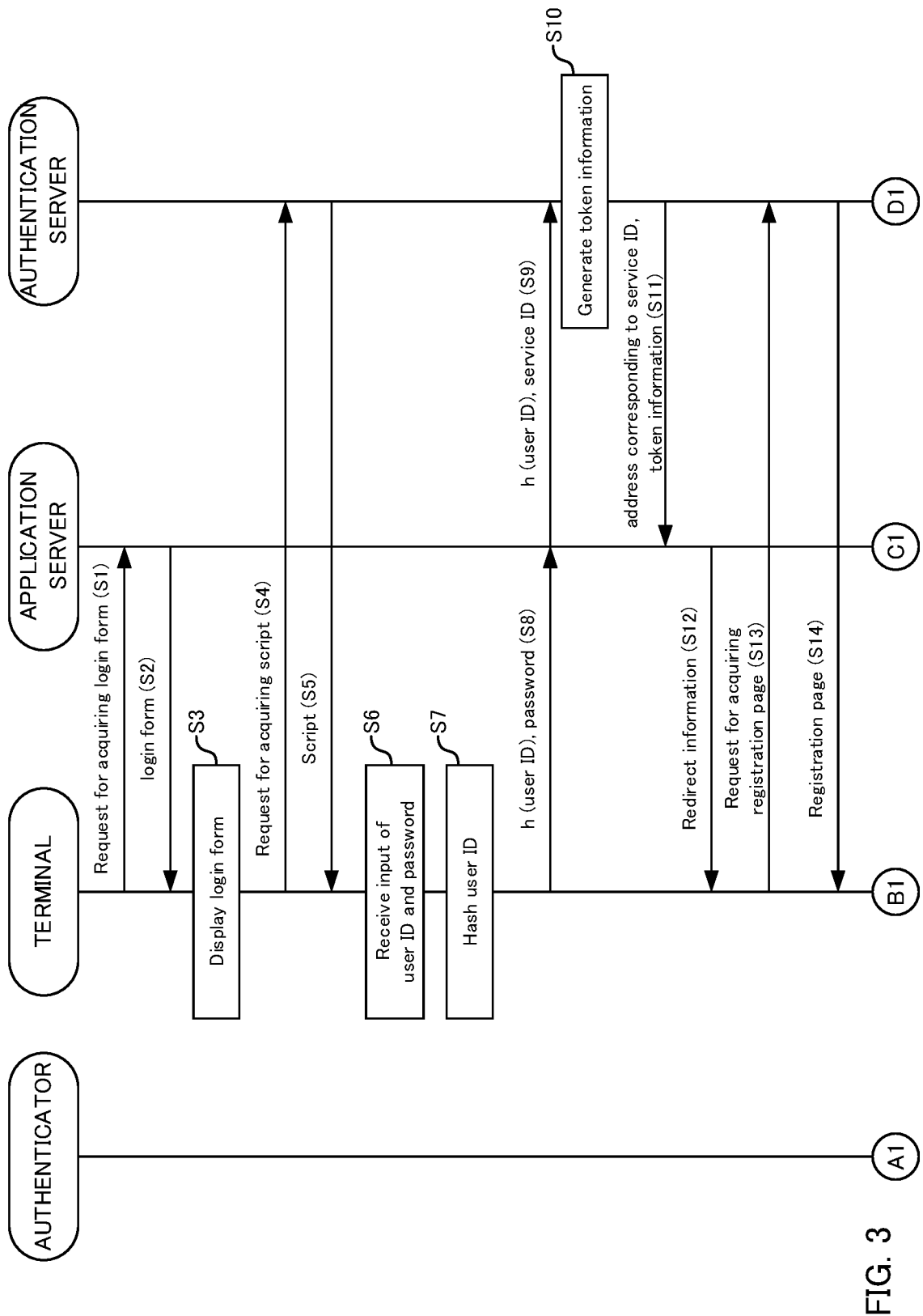
FIG. 3 is a sequence diagram showing processing in the case where the authentication server according to the embodiment registers information for possession authentication.
Figure 4:
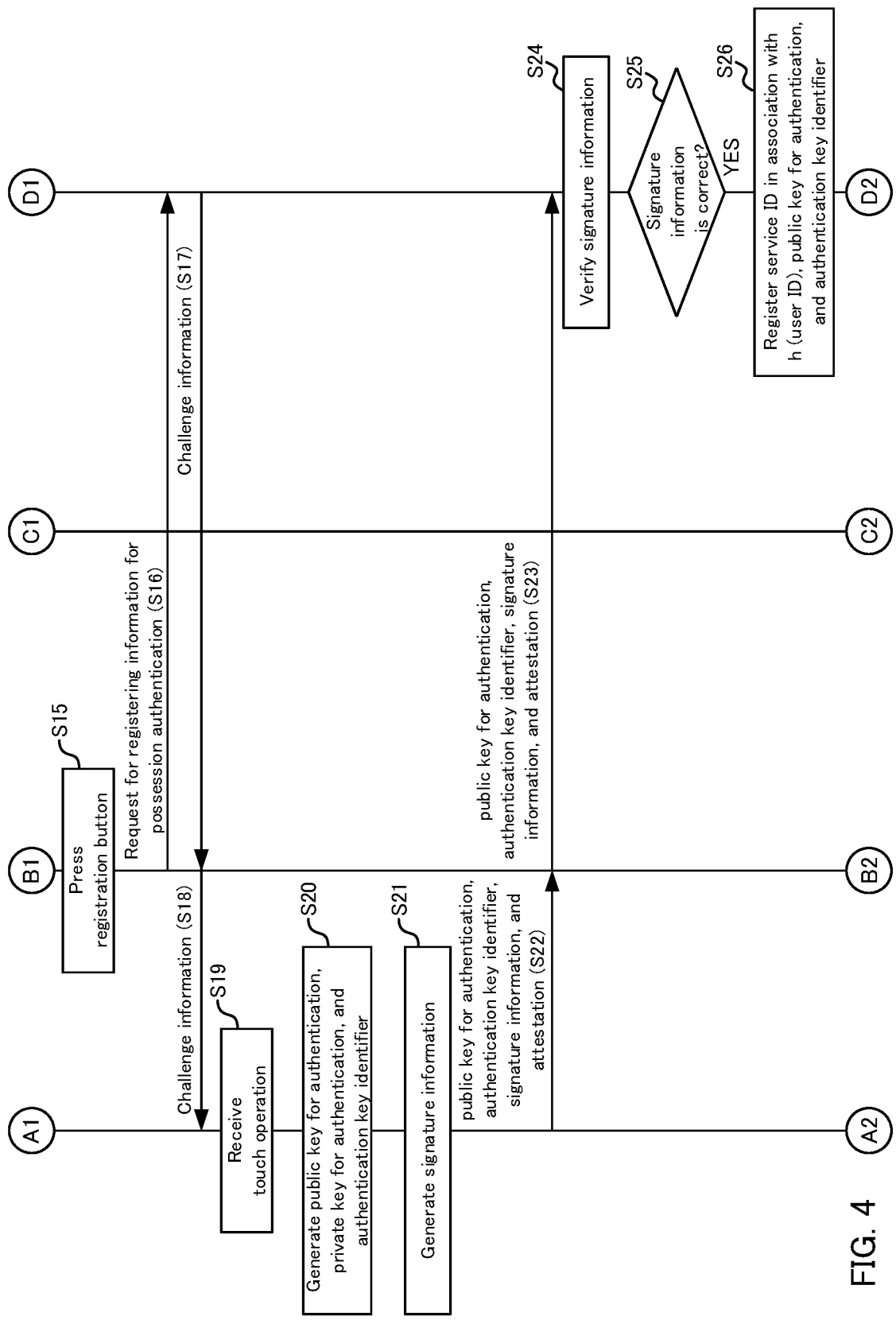
FIG. 4 shows a sequence following FIG. 3.
Figure 5:
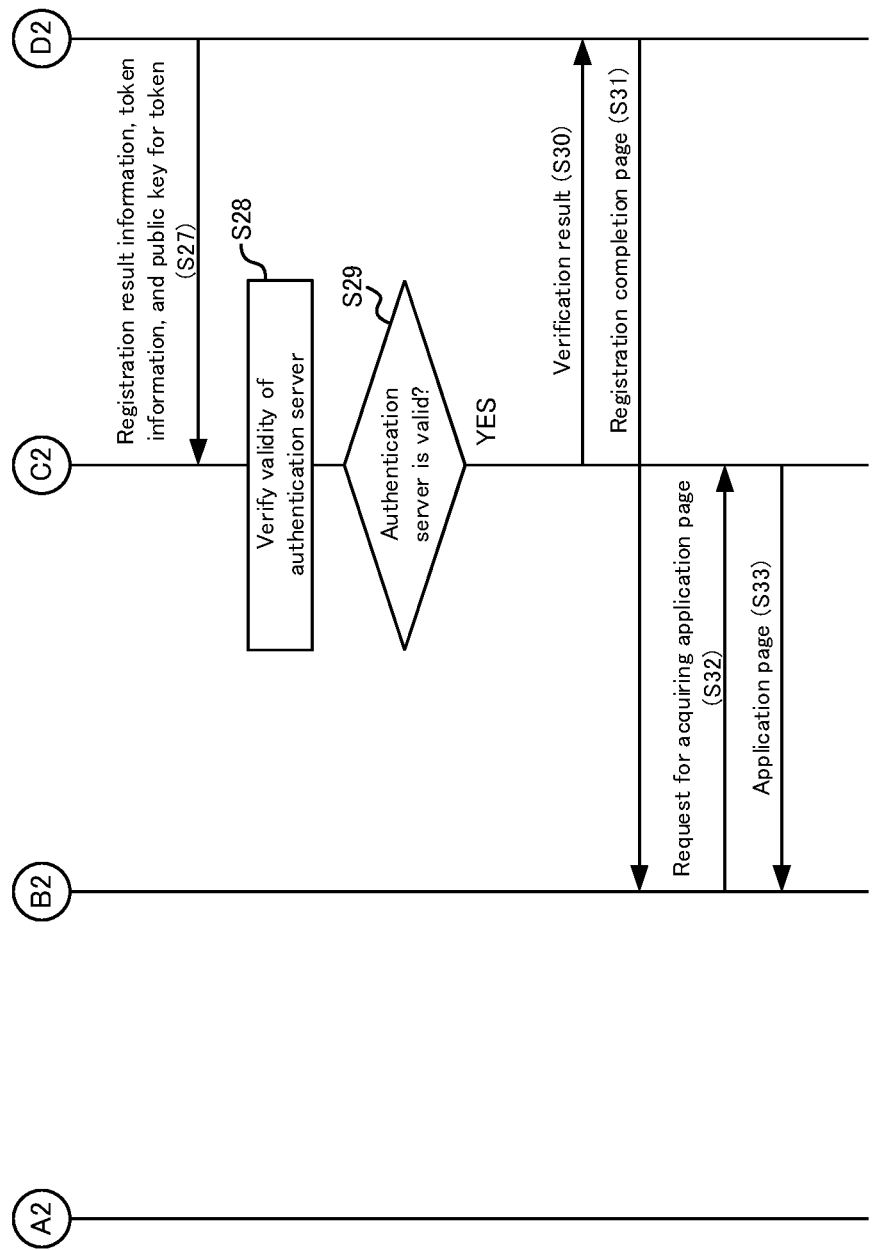
FIG. 5 shows a sequence following FIG. 4.

Hereinafter, the functions of the authentication server 1 and the application server 2 will be described in detail in accordance with a sequence in the authentication system S. First, a sequence in the case where the authentication server 1 registers the information for possession authentication relating to the authenticator 4 possessed by the user U will be described. FIGS. 3 to 5 are sequence diagrams showing processing in the case where the authentication server 1 according to the embodiment registers the information for possession authentication.

First, the authentication receiving part 220 of the application server 2 receives, from the terminal 3, a request for acquiring a login form (step S1). When the authentication receiving part 220 receives the request for acquiring a login form, the authentication receiving part 220 transmits the login form to the terminal 3 (step S2). The login form is embedded with an address for obtaining, from the authentication server 1, JavaScript (registered trademark) as a script for hashing a user ID. The application server 2 manages the login form and a service ID in association with each other. Here, the service ID is identification information for identifying the application server 2 and is a character string having a predetermined length.

Upon receiving the login form, the terminal 3 causes its own display (not shown in figures) to display the login form (step S3). When the terminal 3 causes the display to display the login form, the terminal 3 transmits a request for acquiring a script to the authentication server 1 on the basis of the address for acquiring a script from the authentication server 1 (step S4). When the controller 12 of the authentication server 1 receives the request for acquiring a script, the controller 12 transmits the script to the terminal 3 (step S5).

The terminal 3 receives an input of the user ID and a password from the user U (step S6). When the user ID is inputted, the terminal 3 hashes the user ID on the basis of the script received from the authentication server 1 (step S7). In FIG. 3, the hashed user ID is referred to as h (user ID).

The login form includes a transmission button for transmitting the user ID and the password to the application server 2. When the transmission button is pressed, the terminal 3 transmits the user ID, a hashed user ID, and the password to the application server 2 by an HTTPS POST method (step S8). The authentication receiving part 220 acquires the user ID, the hashed user ID, and the password from the terminal 3.

The requesting part 221 performs password authentication on the basis of the user ID and the password acquired from the terminal 3 by the authentication receiving part 220. The storage 21 of the application server 2 stores password authentication information including the user ID and the password associated with each other. If the hashed user ID and the password acquired from the terminal 3 by the authentication receiving part 220 are stored in the storage 21, the requesting part 221 determines that the password authentication is successful.

If the password authentication succeeds after the authentication receiving part 220 acquires the hashed user ID and the password, the requesting part 221 transmits the hashed user ID and the service ID associated with the login form to the authentication server 1 by the HTTPS POST method (step S9). In this way, the user ID is not handled as-is in the authentication server 1, and so it is possible to prevent the user ID from leaking from the authentication server 1.

When the address information transmission part 120 of the authentication server 1 receives the hashed user ID and the service ID, the address information transmission part 120 generates token information used between the authentication server 1 and the application server 2 (step S10). Specifically, the address information transmission part 120 generates signature information obtained by encrypting, with a private key for a token stored in advance in the storage 11, a) the hashed user ID, b) the service ID, and c) time information indicating the current time, as the token information. The token information is used for session management and as first information for verification.

Further, the storage 11 stores the service ID and an application ID for identifying the application server 2 in association with each other, and the address information transmission part 120 specifies the application ID associated with the received service ID. The application ID is, for example, information for identifying the application server 2, and is a parameter included in addresses of a registration page and a possession authentication page which will be described later. The address information transmission part 120 transmits, to the application server 2, a) an address that is the address of the authentication server 1 and includes the application ID corresponding to the service ID and b) the generated token information (step S11).

When the requesting part 221 receives the address including the application ID and the generated token information from the authentication server 1, the requesting part 221 determines whether or not the information for possession authentication corresponding to the user ID is registered in the authentication server 1. The storage 21 stores a) the user ID and b) the registration status information indicating whether or not the information for possession authentication is registered in the authentication server 1 in association with each other. The requesting part 221 determines whether or not the information for possession authentication corresponding to the user ID is registered in the authentication server 1 on the basis of the registration status information associated with the user ID.

If the requesting part 221 determines that the information for possession authentication corresponding to the user ID is not registered in the authentication server 1, the requesting part 221 requests that the authentication server 1 register the information for possession authentication corresponding to the user ID. Specifically, if the requesting part 221 determines that the information for possession authentication corresponding to the user ID is not registered in the authentication server 1, the requesting part 221 adds information requesting registration of the information for possession authentication to the address received from the authentication server 1 to generate the address of the registration page.

It should be noted that the requesting part 221 determines whether or not the information for possession authentication corresponding to the user ID is registered in the authentication server 1 when the requesting part 221 receives the address including the application ID and the generated token information from the authentication server 1, but the present disclosure is not limited thereto. For example, the requesting part 221 may determine whether or not the information for possession authentication corresponding to the user ID is registered in the authentication server 1 at the time of performing login authentication. In this case, if the requesting part 221 determines that the information for possession authentication corresponding to the user ID is not registered in the authentication server 1, the requesting part 221 may transmit the information indicating the request for registering the information for possession authentication together with the hashed user ID and the service ID to the authentication server 1, and may acquire the address of the registration page including the application ID as the address including the application ID from the authentication server 1.

The requesting part 221 transmits redirect information, for redirecting the terminal 3 to the registration page, to the terminal 3 (step S12). The requesting part 221 causes the terminal 3 to access the registration page of the authentication server 1 on the basis of said redirect information to request registration of the information for possession authentication.

Upon receiving the redirect information, the terminal 3 transmits a request for acquiring the registration page to the authentication server 1 (step S13). When the registration part 121 of the authentication server 1 receives the request for registering the information for possession authentication by receiving the request for acquiring the registration page from the application server 2 via the terminal 3, the registration part 121 acquires and registers the information for possession authentication from the terminal 3. Specifically, first, when the registration part 121 receives the request for acquiring the registration page from the terminal 3, the registration part 121 transmits the registration page to the terminal 3 (step S14). The registration page is provided with a registration button for transmitting a request for registering the information for possession authentication.

A connection point A1, a connection point B1, a connection point C1, and a connection point D1 in FIG. 3 are respectively connected to the connection point A1, the connection point B1, the connection point C1, and the connection point D1 in FIG. 4. Hereinafter, the process shown in the sequence diagram of FIG. 4 will be described.

When the registration button is pressed (step S15), the terminal 3 transmits the request for registering the information for possession authentication to the authentication server 1 (step S16).

When the registration part 121 of the authentication server 1 receives the request for registering the information for possession authentication from the terminal 3, the registration part 121 generates challenge information that is a random character string, and transmits the challenge information to the terminal 3 (step S17).

The terminal 3 notifies the authenticator 4 connected thereto of the challenge information, and causes its display to display an instruction of a touch operation for touching the authenticator 4, to notify the user U to touch the authenticator 4 (step S18).

Upon receiving the touch operation from the user U (step S19), the authenticator 4 generates a private key for authentication and a public key for authentication paired with said private key for authentication, and generates an authentication key identifier for identifying the private key for authentication and the public key for authentication (step S20).

Subsequently, the authenticator 4 generates the signature information by encrypting the challenge information, the public key for authentication, and the authentication key identifier with the private key for authentication (step S21). The authenticator 4 notifies the terminal 3 of the public key for authentication, the authentication key identifier, the signature information, and an attestation (step S22). The attestation is information signed by a private key for attestation that is different from the private key for authentication, and is used in the authentication server 1 to determine whether or not the authentication server 1 accepts the authenticator 4.

The terminal 3 transmits the public key for authentication, the authentication key identifier, the signature information, and the attestation to the authentication server 1 (step S23).

The registration part 121 of the authentication server 1 verifies whether or not the signature information received from the terminal 3 is correct (step S24). Specifically, the registration part 121 verifies the validity of the authenticator 4 on the basis of the attestation received from the terminal 3. If the registration part 121 determines that the authenticator 4 is valid, the registration part 121 decrypts the signature information using the received public key for authentication to acquire the challenge information, the public key for authentication, and the authentication key identifier included in the signature information. The registration part 121 verifies the signature information by determining whether or not the challenge information, the public key for authentication, and the authentication key identifier acquired from the signature information match the challenge information transmitted in step S17, the received public key for authentication, and the received authentication key identifier.

If the registration part 121 determines that the signature information is correct (step S25), the registration part 121 associates the hashed user ID received in step S9, the public key for authentication, and the authentication key identifier with the service ID received from the application server 2 in step S9, and stores these pieces of information in the storage 11 (step S26).

A connection point A2, a connection point B2, a connection point C2, and a connection point D2 in FIG. 4 are respectively connected to the connection point A2, the connection point B2, the connection point C2, and the connection point D2 in FIG. 5. Hereinafter, the process shown in the sequence diagram of FIG. 5 will be described.

The authentication server 1 transmits a) registration result information indicating a result of the registration in step S26, b) the token information generated in step S10, and c) a public key for a token corresponding to said token information to the application server 2 (step S27).

When the verifying part 222 of the application server 2 receives the registration result information, the token information, and the public key for the token from the authentication server 1, the verifying part 222 verifies the validity of the authentication server 1 (step S28). Specifically, the verifying part 222 verifies the validity of the authentication server 1 on the basis of whether or not the token information received together with the registration result information can be decrypted using the public key for the token. It should be noted that the verifying part 222 may verify the validity of the authentication server 1 on the basis of whether the token information received in step S11 matches the token information received in step S27.

If the verifying part 222 determines that the authentication server 1 is valid, the verifying part 222 changes the content of the registration status information stored in association with the hashed user ID in the storage 11 to the content indicating that the information for possession authentication is registered in the authentication server 1. Further, if the verifying part 222 determines that the authentication server 1 is valid, the verifying part 222 transmits a verification result indicating that the authentication server 1 is valid to the authentication server 1 (step S30).

When the registration result transmission part 122 of the authentication server 1 receives the verification result indicating that the authentication server 1 is valid, the registration result transmission part 122 transmits a registration completion page indicating that the registration of the information for possession authentication is completed to the terminal 3 (step S31). Here, the registration completion page shows information indicating that the registration of the information for possession authentication is completed, and includes an OK button for requesting that the application server 2 provide the function of the application provided by the application server 2.

The terminal 3 causes the display to display the received registration completion page. When the OK button is pressed on the registration completion page, the terminal 3 transmits a request for acquiring an application page to the application server 2 (step S32). It should be noted that the request for acquiring the application page may be made by redirection.

When the providing part 223 of the application server 2 receives the request for acquiring the application page, the providing part 223 transmits the application page to the terminal 3 (step S33).

It should be noted that steps S13 to S26 of the sequence diagrams of FIGS. 3 to 4 show the processing of registering the information for possession authentication by U2F of FIDO, but the present disclosure is not limited thereto, and the information for possession authentication may be registered through other processing procedures.

[A Sequence for Performing the Possession Authentication Using the Authenticator 4]

Figure 6:
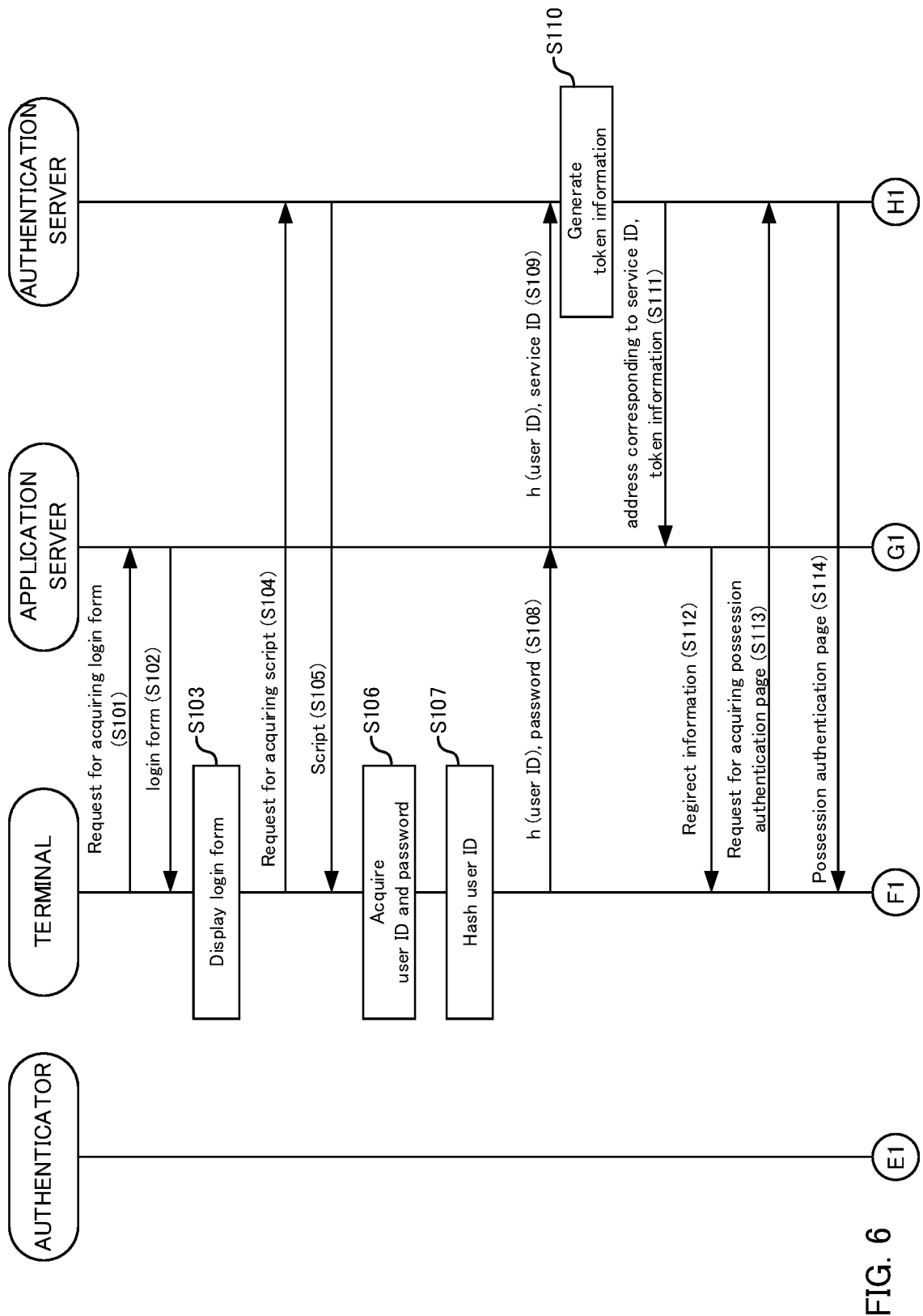
FIG. 6 is a sequence diagram showing processing in the case where the authentication server according to the embodiment performs possession authentication using an authenticator possessed by a user.
Figure 7:
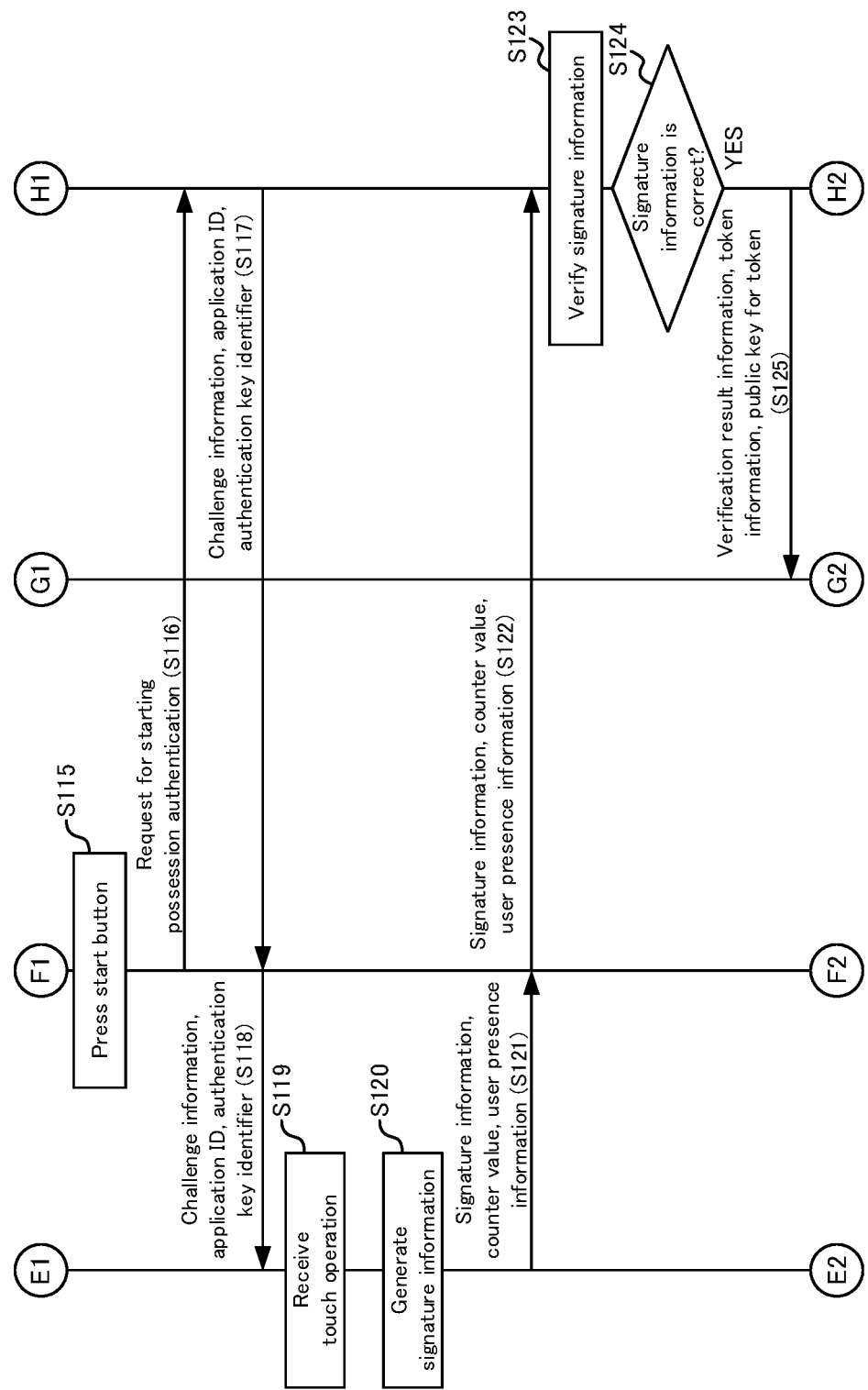
FIG. 7 shows a sequence following FIG. 6.
Figure 8:
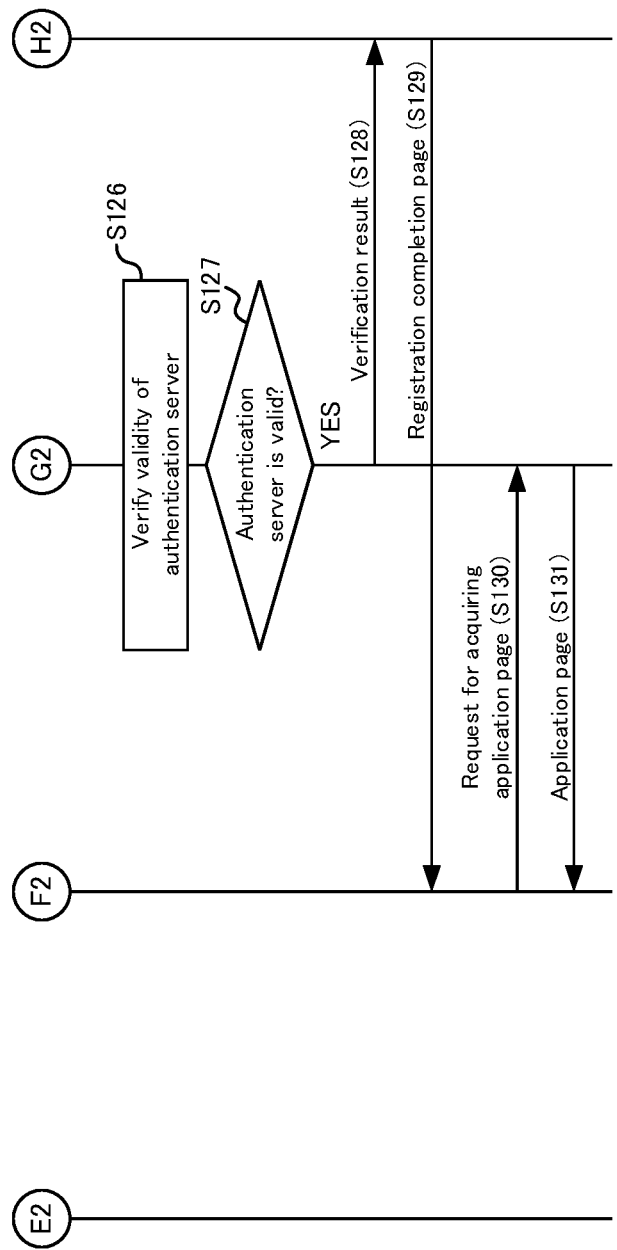
FIG. 8 shows a sequence following FIG. 7.

Next, a sequence in the case of performing the possession authentication using the authenticator 4 will be described. FIGS. 6 to 8 are sequence diagrams showing processing in the case where the authentication server 1 according to the embodiment performs the possession authentication using the authenticator 4 possessed by the user U.

The processing from step S101 to step S111 in FIG. 6 is the same as the processing from step S1 to step S11 in FIG. 3, and therefore the explanation thereof is omitted.

In this sequence, it is assumed that the user ID and the password acquired by the authentication receiving part 220 are stored in the storage 21 in association with each other, the information for possession authentication corresponding to the user ID is registered in the authentication server 1, and the password authentication is successful.

It should be noted that the requesting part 221 may determine whether or not the information for possession authentication corresponding to the user ID is registered in the authentication server 1 at the time of performing the login authentication. If the requesting part 221 determines that the information for possession authentication corresponding to the user ID is registered in the authentication server 1, the requesting part 221 may transmit information indicating a request for possession authentication together with the hashed user ID and the service ID to the authentication server 1, and acquire the address of the possession authentication page including the application ID as an address including the application ID from the authentication server 1.

If the requesting part 221 determines that the information for possession authentication corresponding to the user ID is registered in the authentication server 1 on the basis of the registration status information associated with the user ID in the storage 21, the requesting part 221 requests that the authentication server 1 perform the possession authentication. The requesting part 221 adds the information requesting the possession authentication to the address received from the authentication server 1 to generate the address of the possession authentication page. The requesting part 221 then transmits, to the terminal 3, the redirect information for redirecting the terminal 3 to the possession authentication page (step S112). The requesting part 221 causes said terminal 3 to access the possession authentication page of the authentication server 1 on the basis of the redirect information, thereby causing the terminal 3 to request the possession authentication.

Upon receiving the redirect information, the terminal 3 transmits a request for acquiring the possession authentication page to the authentication server 1 (step S113). When the possession authentication part 123 of the authentication server 1 receives the request for the possession authentication by receiving the request for acquiring the possession authentication page from the application server 2 via the terminal 3, the possession authentication part 123 performs the possession authentication with the terminal 3. Specifically, first, when the registration part 121 receives the request for acquiring the possession authentication page from the terminal 3, the registration part 121 transmits the possession authentication page to the terminal 3 (step S114). The possession authentication page includes a start button for starting the possession authentication.

A connection point E1, a connection point F1, a connection point G1, and a connection point H1 in FIG. 6 are respectively connected to the connection point E1, the connection point F1, the connection point G1, and the connection point H1 in FIG. 7. Hereinafter, the process shown in the sequence diagram of FIG. 7 will be described.

When the start button is pressed (step S115), the terminal 3 transmits a request to start the possession authentication to the authentication server 1 (step S116).

When the possession authentication part 123 of the authentication server 1 receives the request to start the possession authentication from the terminal 3, the possession authentication part 123 specifies the hashed user ID acquired in step S109 and the authentication key identifier associated with the service ID acquired in step S109 in the storage 11. Further, the possession authentication part 123 generates challenge information which is a random character string. The possession authentication part 123 transmits the challenge information, the application ID, and the authentication key identifier to the terminal 3 (step S117).

The terminal 3 notifies the authenticator 4 connected thereto of the challenge information, the application ID, and the authentication key identifier, and causes its display to display the instruction of the touch operation for touching the authenticator 4, to notify the user U to touch the authenticator 4 (step S118).

Upon receiving the touch operation from the user U (step S119), the authenticator 4 generates the signature information (step S120). Specifically, the authenticator 4 generates the signature information by encrypting, with the private key for authentication associated with the authentication key identifier notified to the authenticator 4, the challenge information, the application ID, and the authentication key identifier notified from the terminal 3.

The authenticator 4 notifies the terminal 3 of a) the generated signature information, b) user presence information indicating that the user U actually operates the authenticator 4, and c) a counter value indicating the number of times the possession authentication using the authenticator 4 has been performed (step S121).

The terminal 3 transmits, to the authentication server 1, the signature information, the counter value, and the user presence information notified from the authenticator 4 (step S122).

The possession authentication part 123 of the authentication server 1 verifies whether or not the signature information received from the terminal 3 is correct (step S123). Specifically, the possession authentication part 123 verifies the validity of the authenticator 4 on the basis of the user presence information and the counter value received from the terminal 3. If the possession authentication part 123 determines that the authenticator 4 is valid, the possession authentication part 123 decrypts the signature information using the public key for authentication associated with the hashed user ID and the service ID acquired in step S109 to acquire the challenge information, the application ID, and the authentication key identifier included in the signature information. The possession authentication part 123 verifies the signature information by determining whether or not the challenge information, the application ID, and the authentication key identifier acquired from the signature information match the challenge information, the application ID, and the specified authentication key identifier transmitted in step S117.

If the possession authentication part 123 determines that the signature information is correct (step S124), the authentication result transmission part 124 transmits, as information for verification, a) the authentication result information representing a result of the authentication in step S123, b) token information as the signature information generated in step S110, and c) a public key for a token paired with a private key for a token to the application server 2 (step S125).

A connection point E2, a connection point F2, a connection point G2, and a connection point H2 in FIG. 7 are respectively connected to the connection point E2, the connection point F2, the connection point G2, and the connection point H2 in FIG. 8. Hereinafter, the process shown in the sequence diagram of FIG. 8 will be described.

When the verifying part 222 of the application server 2 receives the authentication result information, the token information (signature information), and the public key for the token from the authentication server 1, the verifying part 222 verifies the validity of the authentication server 1 (step S126). Specifically, the verifying part 222 verifies the validity of the authentication server 1 on the basis of whether or not the token information received together with the authentication result information can be decrypted by the public key for the token. It should be noted that the verifying part 222 may verify the validity of the authentication server 1 on the basis of whether or not the token information (the first information for verification) received in step S111 matches the token information (second information for verification) received in step S125.

In addition, if the time difference between a) a time at which the token information was generated included in the token information and b) the current time is equal to or longer than a predetermined period of time, the verifying part 222 may determine that the authentication process takes too much time and consider the authentication to be a failure.

If the verifying part 222 verifies that the authentication server 1 is valid, the providing part 223 provides the function related to the application to the terminal 3.

Specifically, first, if the providing part 223 determines that the authentication server 1 is valid (step S127), the providing part 223 transmits a verification result indicating that the authentication server 1 is valid to the authentication server 1 (step S128).

When the authentication result transmission part 124 of the authentication server 1 receives the verification result indicating that the authentication server 1 is valid, the authentication result transmission part 124 transmits, to the terminal 3, the authentication completion page indicating that the authentication is successful (step S129). Here, the authentication completion page shows information indicating that the authentication is successful, and an OK button is provided for requesting the application server 2 to provide the function of the application provided by the application server 2.

The terminal 3 causes the display to display the received authentication completion page. When the OK button is pressed on the authentication completion page, the terminal 3 transmits a request for acquiring the application page to the application server 2 (step S130). It should be noted that the request for acquiring the application page may be made by redirection.

When the providing part 223 of the application server 2 receives the request for acquiring the application page, the providing part 223 transmits the application page to the terminal 3 (step S131).

It should be noted that steps S113 to S123 of the sequence diagrams of FIGS. 6 to 7 show the processing related to the possession authentication using U2F of FIDO, but the present disclosure is not limited thereto, and the possession authentication may be performed through other processing procedures.

<Effects of the Authentication System S According to the Embodiment>

As described above, according to the authentication system S of the embodiment, when the application server 2 receives the request for authentication of the user from the terminal 3 used by the user U, the application server 2 requests that the authentication server 1 perform the possession authentication. When the authentication server 1 receives the request for the possession authentication, the authentication server 1 performs the possession authentication with the terminal 3 and transmits the authentication result of the possession authentication and the information for verification to the application server 2. When the application server 2 receives, from the authentication server 1, the authentication result of the possession authentication and the information for verification used for verifying the validity of the authentication server 1 and determines that the authentication server 1 is valid on the basis of the received information for verification, the application server 2 provides the function related to the application to the terminal 3.

Because the authentication system S is configured in this way, in order to perform the possession authentication when authenticating the user U in the application server 2, the operator of the application server 2 implements, a) the function of performing the processing related to the request for the possession authentication and b) the function of performing the processing related to the verification of the authentication server 1 on the basis of the information for verification on the application server 2, thereby the application server 2 can easily recognizing the result of the possession authentication.

The present invention is explained on the basis of the exemplary embodiments. The technical scope of the present invention is not limited to the scope explained in the above embodiments and it is possible to make various changes and modifications within the scope of the invention. For example, the specific embodiments of the distribution and integration of the apparatus are not limited to the above embodiments, all or part thereof, can be configured with any unit which is functionally or physically dispersed or integrated. Further, new exemplary embodiments generated by arbitrary combinations of them are included in the exemplary embodiments of the present invention. Further, effects of the new exemplary embodiments brought by the combinations also have the effects of the original exemplary embodiments.

What is claimed is:

1. An authentication system comprising:
an application providing server that provides an application; and
an authentication server that performs possession authentication which is authentication using an authenticator possessed by a user using the application, wherein
the application providing server includes a first processor that functions as:
a requesting part that requests that the possession authentication be performed by the authentication server when the requesting part receives a request for authentication of the user from a terminal used by the user;
a verifying part that receives an authentication result of the possession authentication and information for verification used for verifying validity of the authentication server from the authentication server, and verifies the validity of the authentication server on the basis of the received information for verification; and
a providing part that provides a function related to the application to the terminal if the verifying part verifies that the authentication server is valid, and
the authentication server includes a second processor that functions as:
a possession authentication part that performs the possession authentication with the authenticator connected to the terminal when the possession authentication part receives the request for the possession authentication; and
a result transmission part that transmits the authentication result of the possession authentication and the information for verification to the application providing server, wherein
the result transmission part transmits a) the signature information obtained by encrypting the token information including the user identification information for identifying the user received from the terminal with the private key for the token and b) the public key for the token, which is paired with the private key for the token, to the application providing server as the information for verification, and
the verifying part verifies the validity of the authentication server on the basis of whether or not the user identification information obtained by decrypting the signature information received from the authentication server with the public key for the token matches the user identification information received from the terminal.

2. The authentication system according to claim 1, wherein
the authentication system includes a plurality of the application providing server,
the requesting part transmits service identification information for identifying the application providing server to the authentication server, and
the possession authentication part performs the possession authentication corresponding to the service identification information with the terminal when a possession authentication part receives the service identification information.

3. The authentication system according to claim 2, wherein
the requesting part determines whether or not the information for possession authentication relating to the authenticator possessed by the user is registered in the authentication server, and if the requesting part determines that the information for possession authentication is registered in the authentication server, the requesting part requests that the authentication server perform the possession authentication.

4. The authentication system according to claim 3, wherein
the requesting part requests that the authentication server register the information for possession authentication if the requesting part determines that the information for possession authentication is not registered in the authentication server, and
the second processor of the authentication server further functions as:
a registration part that acquires and registers the information for possession authentication from the authenticator connected to the terminal when the registration part receives a request for registering the information for possession authentication from the application providing server.

5. The authentication system according to claim 4, wherein
the second processor of the authentication server further further functions as:
an address information transmission part that transmits, to the application providing server, an address of the authentication server corresponding to the service identification information when the address information transmission part receives the service identification information, wherein if the requesting part determines that the information for possession authentication is registered in the authentication server, the requesting part adds information requesting the possession authentication to the address received from the authentication server and transmits the address to the terminal to cause the terminal to request the possession authentication on the basis of the address.

6. The authentication system according to claim 4, wherein the second processor of the authentication server further further functions as:

an address information transmission part that transmits, to the application providing server, an address of the authentication server corresponding to the service identification information when the address information transmission part receives the service identification information, wherein if the requesting part determines that the information for possession authentication is not registered in the authentication server, the requesting part adds information requesting registration of the information for possession authentication to the address received from the authentication server and transmits the address to the terminal to cause the terminal to request registration of the information for possession authentication on the basis of the address.

7. The authentication system according to claim 5, wherein the address information transmission part transmits the signature information obtained by encrypting token information used between the authentication server and the application providing server with a private key for a token, to the application providing server as first information for verification, when the address information transmission part receives the service identification information, the result transmission part transmits the signature information obtained by encrypting the token information with the private key for the token, as second information for verification, to the application providing server together with the authentication result of the possession authentication, and the verifying part verifies the validity of the authentication server on the basis of whether or not the received first information for verification matches the received second information for verification.

8. The authentication system according to claim 1, wherein the requesting part acquires hashed user identification information from the terminal, and transmits the hashed user identification information to the authentication server, and the result transmission part transmits the signature information obtained by encrypting the token information including the hashed user identification information received from the terminal via the requesting part with the private key for the token, to the application providing server.

9. The authentication system according to claim 8, wherein the first processor of the application providing server further functions as:

an authentication receiving part that transmits, to the terminal, a page provided by the authentication server for the terminal to acquire a script for hashing the user identification information, when the authentication receiving part receives a request for authentication of the user from the terminal, wherein the requesting part acquires, from the terminal, the user identification information hashed by the script.

10. An authentication method performed by an authentication system that includes an application providing server that provides an application, and an authentication server that performs possession authentication which is authentication using an authenticator possessed by a user using the application, the method comprising the steps of:

requesting, by the application providing server, that the authentication server perform the possession authentication using the authenticator when the application providing server receives a request for authentication of the user from a terminal used by the user;

performing, by the authentication server, the possession authentication with the authenticator connected to the terminal when the authentication server receives the request for the possession authentication;

transmitting, by the authentication server, the authentication result of the possession authentication and information for verification used for verifying validity of the authentication server to the application providing server;

receiving the authentication result and the information for verification from the authentication server and verifying validity of the authentication server on the basis of the received information for verification, by the application providing server; and providing, by the application providing server, a function related to the application to the terminal if the authentication server is verified valid, wherein the step of transmitting comprises transmitting a) the signature information obtained by encrypting the token information including the user identification info illation for identifying the user received from the terminal with the private key for the token and b) the public key for the token, which is paired with the private key for the token, to the application providing server as the information for verification, and the step of verifying comprises verifying the validity of the authentication server on the basis of whether or not the user identification information obtained by decrypting the signature information received from the authentication server with the public key for the token matches the user identification information received from the terminal.

11. An authentication system comprising:

a plurality of application providing servers that each provides an application; and an authentication server that performs possession authentication which is authentication using an authenticator possessed by a user using the application, wherein the application providing server includes a first processor that functions as:

a requesting part that requests that the possession authentication be performed by the authentication server when the requesting part receives a request for authentication of the user from a terminal used by the user;

a verifying part that receives an authentication result of the possession authentication and information for verification used for verifying validity of the authentication server from the authentication server, and verifies the validity of the authentication server on the basis of the received information for verification; and
a providing part that provides a function related to the application to the terminal if the verifying part verifies that the authentication server is valid, and the authentication server includes a second processor that functions as:
a possession authentication part that performs the possession authentication with the authenticator connected to the terminal when the possession authentication part receives the request for the possession authentication; and
a result transmission part that transmits the authentication result of the possession authentication and the information for verification to the application providing server, the requesting part transmits service identification information for identifying the application providing server to the authentication server, the possession authentication part performs the possession authentication corresponding to the service identification information with the terminal when a possession authentication part receives the service identification information, the requesting part determines whether or not the information for possession authentication relating to the authenticator possessed by the user is registered in the authentication server, and if the requesting part determines that the info illation for possession authentication is registered in the authentication server, the requesting part requests that the authentication server perform the possession authentication, the requesting part requests that the authentication server register the information for possession authentication if the requesting part determines that the information for possession authentication is not registered in the authentication server, and the second processor of the authentication server further functions as:
a registration part that acquires and registers the information for possession authentication from the authenticator connected to the terminal when the registration part receives a request for registering the information for possession authentication from the application providing server,
an address information transmission part that transmits, to the application providing server, an address of the authentication server corresponding to the service identification information when the address information transmission part receives the service identification information, and if the requesting part determines that the information for possession authentication is registered in the authentication server, the requesting part adds information requesting the possession authentication to the address received from the authentication server and transmits the address to the terminal to cause the terminal to request the possession authentication on the basis of the address, the address information transmission part transmits the signature information obtained by encrypting token information used between the authentication server and the application providing server with a private key for a token, to the application providing server as first information for verification, when the address information transmission part receives the service identification information, the result transmission part transmits the signature information obtained by encrypting the token information with the private key for the token, as second information for verification, to the application providing server together with the authentication result of the possession authentication, and the verifying part verifies the validity of the authentication server on the basis of whether or not the received first information for verification matches the received second information for verification.

* * * * *